June 12, 1945.  C. A. COLGREN  2,378,130
CUSHION TIRE
Filed Aug. 25, 1943  2 Sheets-Sheet 1
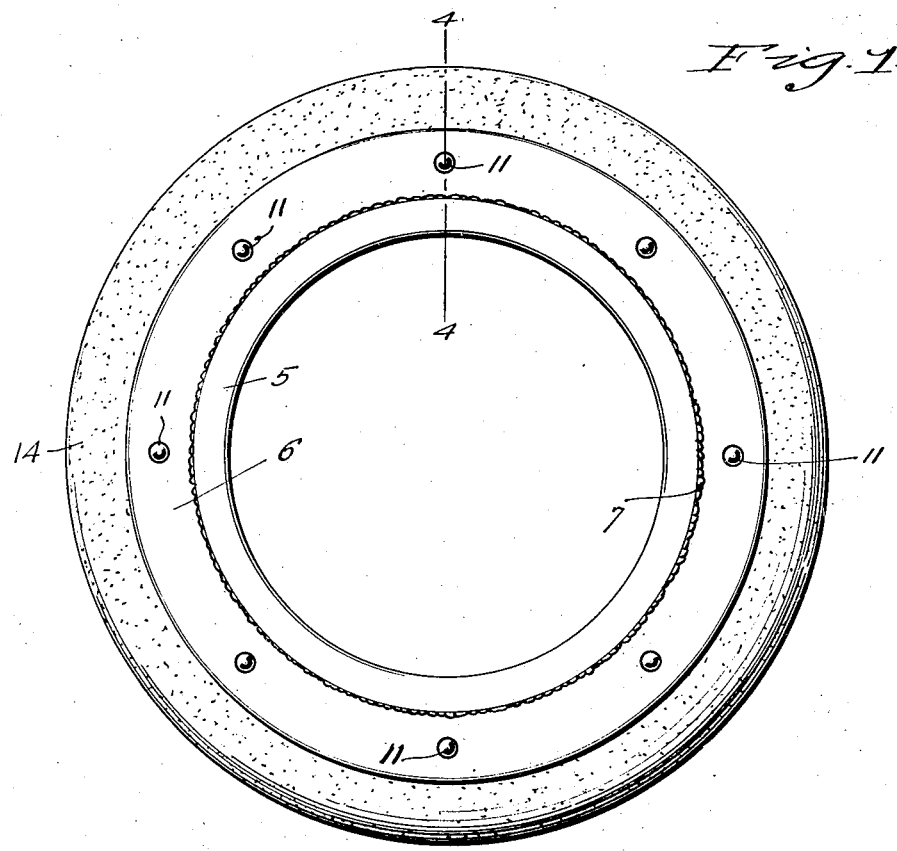
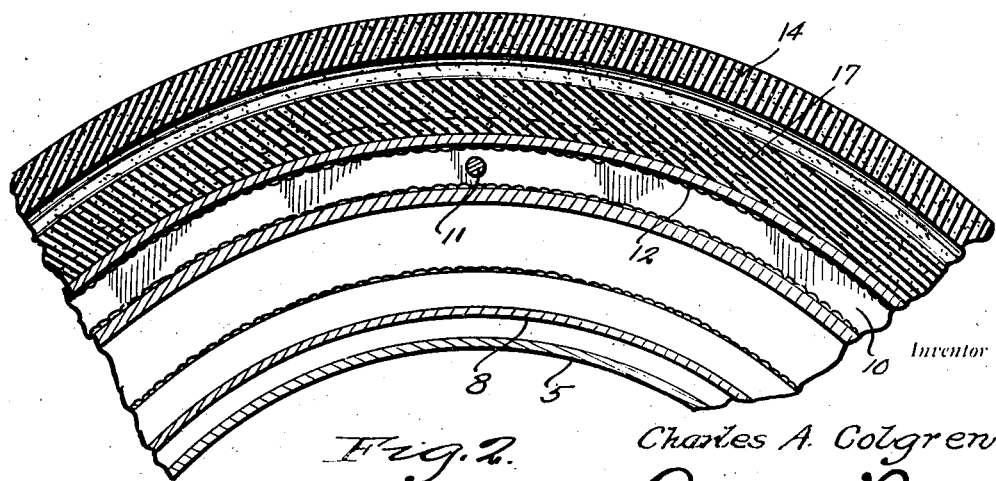

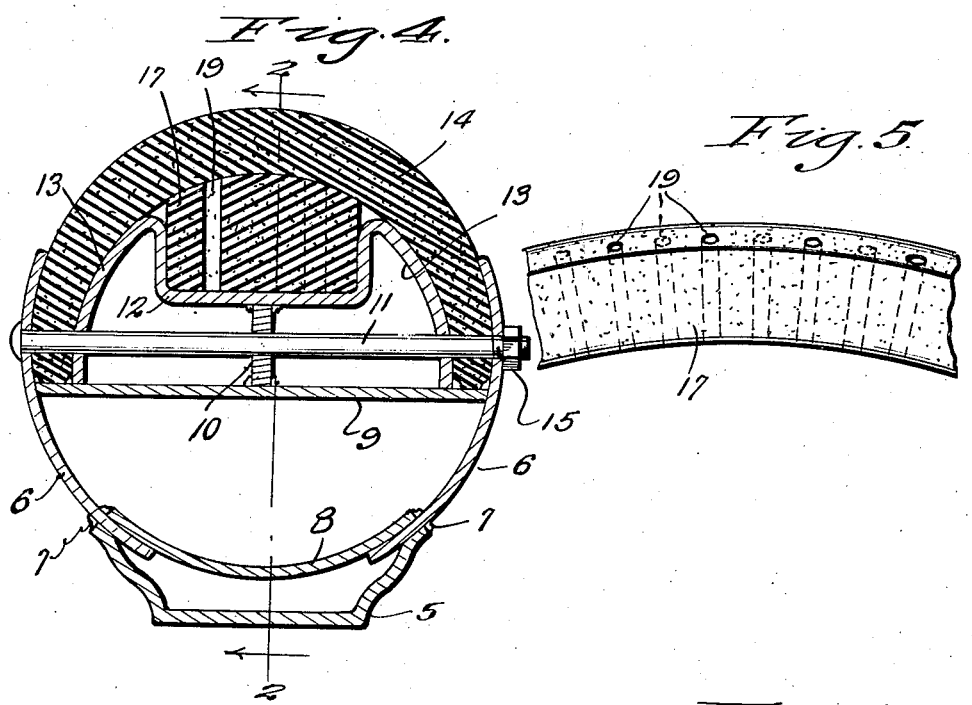
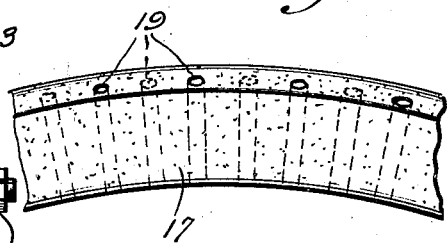
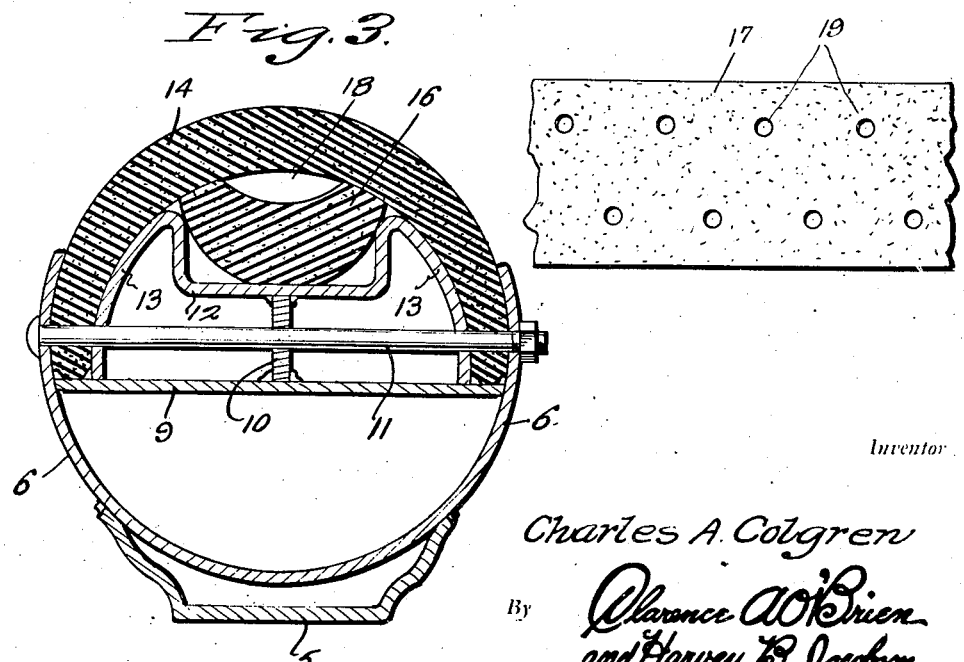

Patented June 12, 1945

2,378,130

UNITED STATES PATENT OFFICE 2,378,130

CUSHION TIRE

Charles A. Colgren, Jeffersonville, Ind.

Application August 25, 1943, Serial No. 499,988

2 Claims. (Cl. 152—246)

This invention relates to new and useful improvements in cushion tires for vehicles.

The principal object of the present invention is to provide a cushion tire which will dispense with the use of inner tubes without sacrificing any of the resiliency of pneumatic present day tires.

Other objects and advantages of the invention will become apparent to the reader of the following description.

In the drawings:

Figure 1 is a side elevational view of the tire.

Figure 2 is a fragmentary circumferential sectional view of the tire.

Figure 3 is a transverse sectional view showing one form of cushion ring.

Figure 4 is a cross sectional view showing another from of cushion ring.

Figure 5 is a side elevational view of the cushion ring shown in Figure 4.

Figure 6 is a fragmentary top plan view of the cushion ring shown in Figure 4.

Referring to the drawings wherein like numerals designate like parts, it can be seen that numeral 5 denotes a rim to which arcuate side walls 6, 6 are welded as at 7. Numeral 8 denotes a bridge member between the inner edge portions of the side walls 6, 6. The parts so far named are preferably of metal.

Numeral 9 denotes a circumferential cylinder and welded to the central portion of this is a brace ring 10.

At predetermined intervals, the brace ring has openings therein and through these openings pass bolts 11.

Numeral 12 denotes a channeled circumferential structure having backwardly curved side flanges 13 which abut the cylinder 9 and the trough portion of this channeled member is welded to the outer edge of the brace ring 10.

Numeral 14 denotes a resilient tire, the edge portions of which are interposed between the side flanges 13 and the walls 6, and as can be seen in Figures 3 and 4, the bolts 11 pass not only through the ring 10, but also through the flanges 13 and walls 6 and are equipped with nuts 15.

One form of the invention is shown in Figure 3 and another in Figure 4 as regards a cushion ring for disposition in the trough of the channeled structure 12. Numeral 16 denotes this cushion ring for the form of the invention shown in Figure 3, while numeral 17 denotes the cushion ring for the form of the invention shown in Figure 4. The ring 16 is of arcuate shape in cross section, with its concave side opposed to the tire 14 with the result that an air pocket 18 is left between the cushion ring 16 and the tire 14.

The form of the invention shown in Figure 4 and denoted by numeral 17 is a solid cushion strip having openings 19 disposed therethrough and obviously these form air pockets with just as much effect as the single circumferential air pocket 18.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, a wheel rim of channel form, a pair of annular transversely arcuate side wall members of plate-like form extending from opposite sides of said rim, respectively, and having inner edges fixed to said sides, a cylinder interposed between said side wall members in surrounding relation to said rim and beyond which the side wall members extend, an annular tread-forming member of resilient material and arcuate form in cross section interposed between the side wall members with the side edges thereof seating on said band, a spreader ring interposed between said band and tread-forming member and having transversely arcuate side flanges fitting in said tread-forming member and seating on said band and a circumferential channel portion intermediate said flanges, bolts extended through said side wall members and through the tread-forming member and said flanges of the spreader ring, and an annular cushion member of resilient material fitted in said channel portion and bearing against the tread-forming member.

2. In combination, a wheel rim of channel form, a pair of annular transversely opposite side wall members of plate-like form extending from opposite sides of said rim, respectively, and having inner edges fixed to said sides, a cylinder interposed between said side wall members in surrounding relation to said rim and beyond which the side wall members extend, an annular tread-forming member of resilient material and arcuate form in cross section interposed between the side wall members with the side edges thereof seating on said band, a spreader ring interposed between said band and tread-forming member and having transversely arcuate side flanges fitting in said tread-forming member and seating on said band and a circumferential channel portion intermediate said flanges, bolts extended through said side wall members and through the tread-forming member and said flanges of the spreader ring, an annular cushion member of resilient material fitted in said channel portion and bearing against the tread-forming member, and a brace ring fitted edgewise between said band and channel portion and welded thereto.

CHARLES A. COLGREN.